United States Patent
Soerensen et al.

(10) Patent No.: US 7,433,389 B2
(45) Date of Patent: Oct. 7, 2008

(54) METHODS AND APPARATUS FOR SPREAD SPECTRUM SIGNAL PROCESSING USING A RECONFIGURABLE COPROCESSOR

(75) Inventors: Joern Soerensen, Aars (DK); Palle Birk, Gistrup (DK); Zoran Zvonar, Boston, MA (US)

(73) Assignee: MediaTek Inc. (TW)

( * ) Notice: Subject to any disclaimer, the term of this patent is extended or adjusted under 35 U.S.C. 154(b) by 1028 days.

(21) Appl. No.: 10/300,055

(22) Filed: Nov. 20, 2002

(65) Prior Publication Data

US 2003/0095531 A1    May 22, 2003

Related U.S. Application Data

(60) Provisional application No. 60/331,606, filed on Nov. 20, 2001.

(51) Int. Cl.
H04B 1/00 (2006.01)
H04B 7/216 (2006.01)
H04L 27/00 (2006.01)

(52) U.S. Cl. .............. 375/150; 375/316; 370/342; 370/441

(58) Field of Classification Search ........... 375/140, 375/142, 145, 147, 150; 370/263, 335, 342, 370/316
See application file for complete search history.

(56) References Cited

U.S. PATENT DOCUMENTS

| | | | | |
|---|---|---|---|---|
| 6,052,600 A * | 4/2000 | Fette et al. | ............ | 455/509 |
| 6,230,307 B1 * | 5/2001 | Davis et al. | ............ | 716/16 |
| 6,249,251 B1 * | 6/2001 | Chang et al. | ............ | 342/378 |
| 6,370,134 B1 * | 4/2002 | Aramaki | ............ | 370/342 |
| 6,408,039 B1 * | 6/2002 | Ito | ............ | 375/347 |
| 6,459,883 B2 | 10/2002 | Subramanian et al. | | |
| 6,587,448 B1 | 7/2003 | Dajer et al. | | |
| 6,618,434 B2 * | 9/2003 | Heidari-Bateni et al. | .... | 375/148 |
| 6,650,694 B1 | 11/2003 | Brown et al. | | |
| 6,658,046 B1 * | 12/2003 | Miura | ............ | 375/148 |
| 6,721,581 B1 * | 4/2004 | Subramanian | ............ | 455/575.1 |
| 6,763,056 B1 * | 7/2004 | Ohsuge | ............ | 375/140 |
| 6,788,731 B2 * | 9/2004 | Kim et al. | ............ | 375/142 |
| 6,792,031 B1 * | 9/2004 | Sriram et al. | ............ | 375/147 |

(Continued)

FOREIGN PATENT DOCUMENTS

EP    1 128 565 A2    8/2001

(Continued)

OTHER PUBLICATIONS

Fawer et al., A Multiprocessor for Implementing a Time-Diversity Spread-Spectrum Receiver, Mar. 5-8, 1990, Digital Communications, 1990, Electronic Circuits and Systems for Communications, Proceedings, 1990, International Zurich Seminar on, pp. 173-180.*

*Primary Examiner*—Mohammed Ghayour
*Assistant Examiner*—Lawrence Williams
(74) *Attorney, Agent, or Firm*—Fish & Richardson P.C.

(57) ABSTRACT

Methods and apparatus are provided for spread spectrum signal processing in a wireless communication system. The apparatus includes a control processor to generate commands for processing spread spectrum signal components and a reconfigurable coprocessor to process the spread spectrum signal components based on the commands and to provide reports to the control processor based on results of processing the signal components.

47 Claims, 10 Drawing Sheets

U.S. PATENT DOCUMENTS

| | | | |
|---|---|---|---|
| 6,795,422 B2 * | 9/2004 | Ohsuge | 370/342 |
| 6,801,564 B2 * | 10/2004 | Rouphael et al. | 375/142 |
| 6,807,227 B2 * | 10/2004 | Chien | 375/224 |
| 6,912,243 B1 * | 6/2005 | Ishioka | 375/147 |
| 6,967,999 B2 * | 11/2005 | Subramanian et al. | 375/224 |
| 7,023,902 B2 * | 4/2006 | Sih et al. | 375/147 |
| 7,209,461 B2 * | 4/2007 | Agrawal et al. | 370/335 |
| 2001/0048714 A1 * | 12/2001 | Jha | 375/150 |
| 2001/0053177 A1 * | 12/2001 | Papasakellariou | 375/142 |
| 2002/0027957 A1 * | 3/2002 | Paulraj et al. | 375/267 |
| 2002/0048313 A1 * | 4/2002 | Garodnick | 375/130 |
| 2002/0048315 A1 * | 4/2002 | Hanada et al. | 375/145 |
| 2002/0054578 A1 * | 5/2002 | Zhang et al. | 370/328 |
| 2002/0065116 A1 * | 5/2002 | Chen et al. | 455/570 |
| 2003/0215002 A1 * | 11/2003 | Gorday et al. | 375/147 |

FOREIGN PATENT DOCUMENTS

| | | |
|---|---|---|
| WO | WO95/01018 A1 | 1/1995 |
| WO | WO97/01227 A1 | 1/1997 |
| WO | WO 00/51261 A1 | 8/2000 |
| WO | WO 00/69086 A1 | 11/2000 |
| WO | WO 01/50147 A1 | 7/2001 |
| WO | WO 01/50616 A1 | 7/2001 |
| WO | WO 01/50646 A1 | 7/2001 |
| WO | 01/55864 | 8/2001 |
| WO | WO 01/59937 A2 | 8/2001 |
| WO | WO 02/08892 A1 | 1/2002 |
| WO | WO 02/11386 A1 | 2/2002 |
| WO | WO 02/11387 A1 | 2/2002 |
| WO | WO 02/11404 A2 | 2/2002 |
| WO | WO 02/27960 A2 | 4/2002 |
| WO | WO 02/43341 A2 | 5/2002 |

\* cited by examiner

| BATCH | (k−1) | K | (k+1) |
|---|---|---|---|
| COPROCESSOR | ......... | • CONTROL PROCESSOR COMMANDS GENERATED IN (k−1) RECEIVED<br>• HANDLE THESE COMMANDS<br>• PREPARE THE REPORTS FOR (k+1) | ......... |
| CONTROL PROCESSOR | ......... | • COPROCESSOR REPORT GENERATED FROM (k−1) RECEIVED<br>• HANDLE THESE REPORTS<br>• PREPARE THE COMMANDS FOR (k+1) | ......... |

*FIG. 7*

METHODS AND APPARATUS FOR SPREAD SPECTRUM SIGNAL PROCESSING USING A RECONFIGURABLE COPROCESSOR

CROSS REFERENCE TO RELATED APPLICATION

This application claims the benefit of provisional application Ser. No. 60/331,606, filed Nov. 20, 2001, which is hereby incorporated by reference in its entirety.

FIELD OF THE INVENTION

The invention relates to wireless communications and, more particularly, to methods and apparatus for spread spectrum signal processing using a reconfigurable coprocessor.

BACKGROUND OF THE INVENTION

Spread spectrum modulation techniques increase the bandwidth of a signal by using a code sequence which is known by both the transmitter and the receiver. In direct sequence spread spectrum (DSSS) systems, the information signal is directly modulated by the code sequence, which is referred to as a spreading code or pseudorandom (PN) code. Code Division Multiple Access (CDMA) is a direct sequence spread spectrum technology for sharing resources in a cellular telephone system. Within a given cell, multiple users must share the frequency spectrum. One method of sharing the spectrum is frequency division, in which the frequency spectrum is divided into multiple frequency channels and each mobile station is allocated a frequency channel to communicate with the base station of the cell. This method is known as frequency division multiple access (FDMA). In another method known as time-division multiple access (TDMA), multiple mobile units share a frequency channel but use it at different times.

Unlike FDMA and TDMA, CDMA allows every mobile unit to communicate with the base station using same frequency channel at the same time. As mentioned above, in CDMA, the baseband information signal is modulated using a code sequence, known as a spreading code. The spreading code is made up of a plurality of elements known as chips. The chip rate (i.e., the number of chips transferred per second) is typically higher than the symbol rate (i.e., the number of data symbols, made up of one or more data bits, transferred per second) of the baseband information signal. The result is that the modulated signal is spread over a much wider frequency spectrum than the baseband information signal.

In a CDMA cellular system, each mobile unit uses a different set of spreading codes to communicate with the base station. The spreading codes are selected to have low cross-correlation with each other. That is, the spreading codes are designed for maximum separation from each other. The base station can identify each transmitting mobile unit based on the spreading code used in the transmission. Similarly, the mobile station may identify and communicate with a base station based on a spreading code for that base station.

However, many different wireless standards use CDMA technology (e.g., IS-95, CDMA200, WCDMA, TD-SCDMA, etc.). These standards are incompatible with each other, as they use different modulation techniques, chip rates, PN codes and protocols.

CDMA communication systems offer many advantages over narrowband systems. For example, multipath signals can cause interference in a narrowband system. Multipath may be created by reflection of signals from objects in the environment, such as trees, buildings, and cars. As illustrated in FIG. 1, a signal transmitted from base station 100 to mobile station 106 has three diverse signal paths. A signal on signal path 108 is reflected from building 102 before reception by mobile station 106. A signal on signal path 110 is reflected from building 104 before reception by mobile station 106. There is no reflection in signal path 112, as the path is directly from base station 100 to mobile station 106. Because signal paths 108, 110, and 112 have different lengths between the base station and the mobile station, each signal may be received at a different time. Unlike narrowband systems, in which such multipath signals may pose a problem known as intersymbol interference, separate multipath signals may be distinguished and separately received in a CDMA system. In addition, signal components received on diverse paths may be aligned in time and combined to produce a stronger signal.

A RAKE receiver is typically employed to process multipath signal components. A RAKE receiver typically includes multiple "fingers," each of which receives and despreads one of the multipath signal components. A finger compensates for delay via associated synchronization (for example delayed lock loop) and correlates a signal received on one of the diverse paths with a spreading code to demodulate the signal and recover the original baseband signal.

A typical RAKE architecture is shown in FIG. 2. In FIG. 2, RAKE fingers 202a-202n receive signal components from an input buffer 200. The delay between paths in the channel is represented by the tap position in the input buffer of each RAKE finger 202. The RAKE fingers 202 despread multipath signals which are subsequently combined to produce a stronger signal. Such RAKE receivers are typically designed to comply with a particular wireless standard. Thus, custom hardware logic is typically provided in the RAKE receiver for using specific spreading codes, chip rates, modulation techniques, and protocols required by a particular wireless standard. As a result, these receivers lack flexibility and operate in accordance with a particular wireless standard. As a result, the mobile station (i.e., the user's cellular telephone) is restricted to operation with the standard and may need to be replaced if the standard is altered or becomes obsolete. From the viewpoint of the mobile station manufacturer, different chip designs are required for different standards. Similar problems exist with RAKE receivers used in base stations.

Accordingly, there is a need for improved methods and apparatus for spread spectrum signal processing in wireless communication systems.

SUMMARY OF THE INVENTION

A solution is to enable multimode operation where different CDMA based standards may be implemented on a reconfigurable platform.

According to a first aspect of the invention, an apparatus is provided for use in a wireless communication system. The apparatus comprises a control processor to generate commands for processing spread spectrum signal components, and a reconfigurable coprocessor to process the spread spectrum signal components based on the commands and to provide reports to the control processor based on results of processing the signal components.

According to another aspect of the invention, a method is provided for signal processing in a wireless communication system. The method comprises generating commands for processing spread spectrum signal components in a control processor, and processing the spread spectrum signal components in a reconfigurable coprocessor based on the commands and generating reports to the control processor based on results of processing the spread spectrum signal components.

According to a further aspect of the invention, a RAKE receiver comprises a programmable number of fingers each configured to demodulate spread spectrum signal components received from a corresponding transmission path, and a sequencer whose program is changed by an external processor to dynamically alter the number of fingers in the RAKE receiver during operation of the RAKE receiver.

According to a further aspect of the invention, a method is provided for signal processing in a wireless communication system. The method comprises using a reconfigurable coprocessor to process a current batch of data based on commands generated by a control processor during processing of a previous batch of data and to generate reports relating to results of processing the current batch of data, and using the control processor to process the reports relating to the previous batch of data and to generate commands relating to a subsequent batch of data during processing of the current batch of data.

According to a further aspect of the invention, an apparatus is provided for use in a wireless communications system. The apparatus comprises a reconfigurable coprocessor having a plurality of resources for use in processing spread spectrum signal components, and a control processor to configure at least some of the plurality of resources in the coprocessor to perform a desired function in processing the spread spectrum signal components.

BRIEF DESCRIPTION OF THE DRAWINGS

FIG. 7 is a table illustrating batch processing according to one embodiment of the invention;

DETAILED DESCRIPTION

Figure 1:
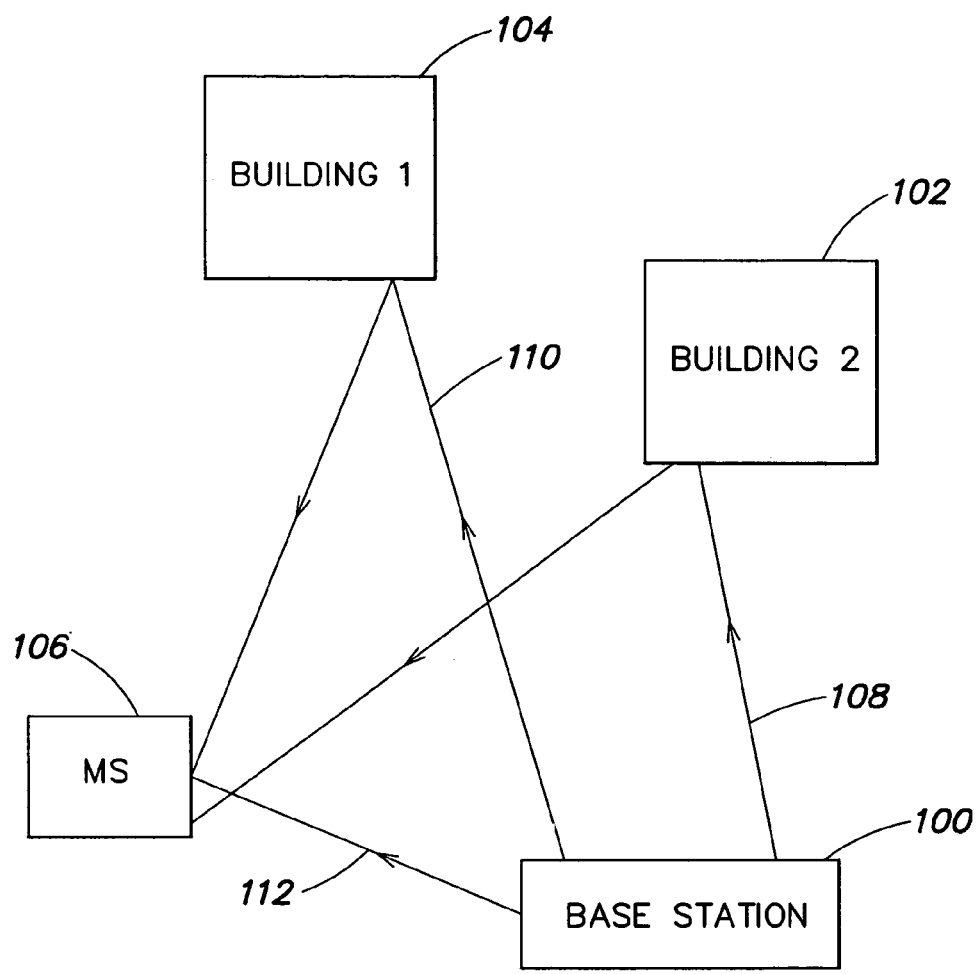
FIG. 1 is a schematic diagram showing an example of a multipath environment in which embodiments of the present invention may be used.
Figure 2:
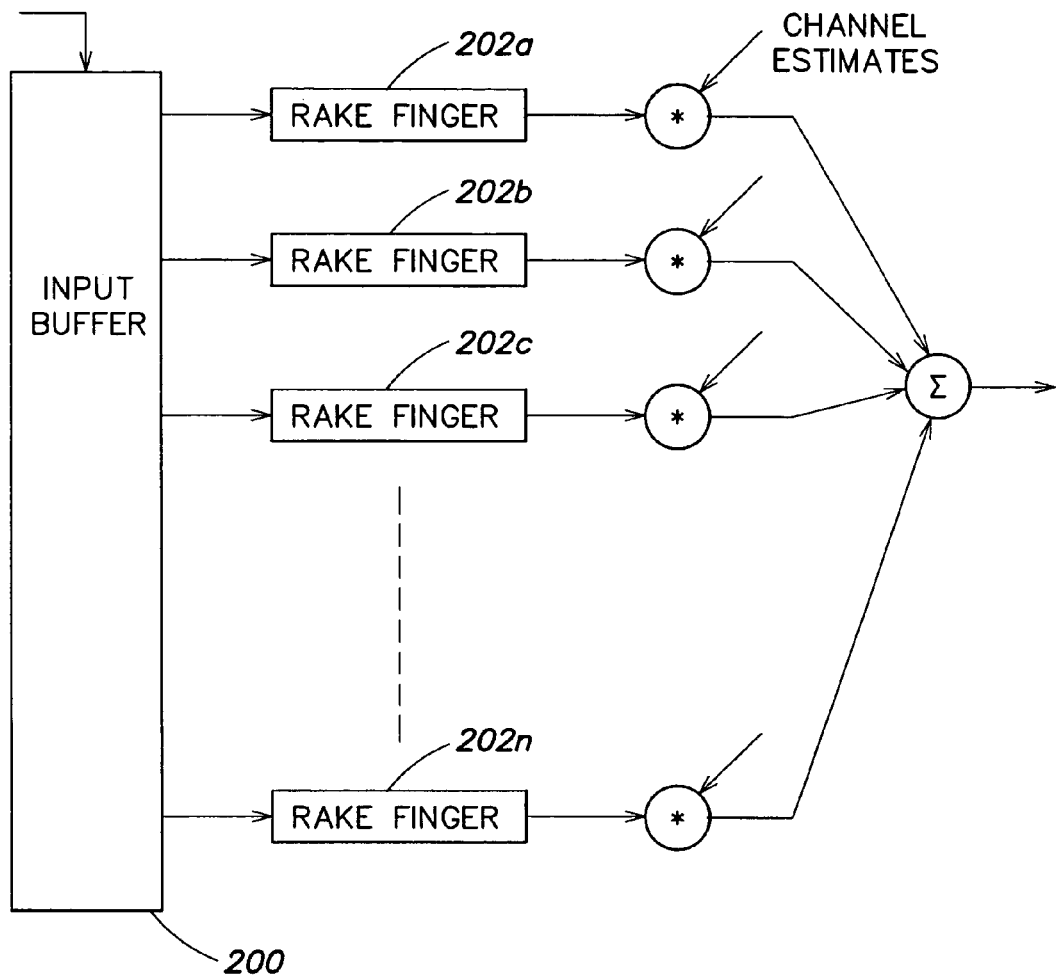
FIG. 2 is a block diagram illustrating an example of an architecture of a RAKE receiver.
Figure 3:
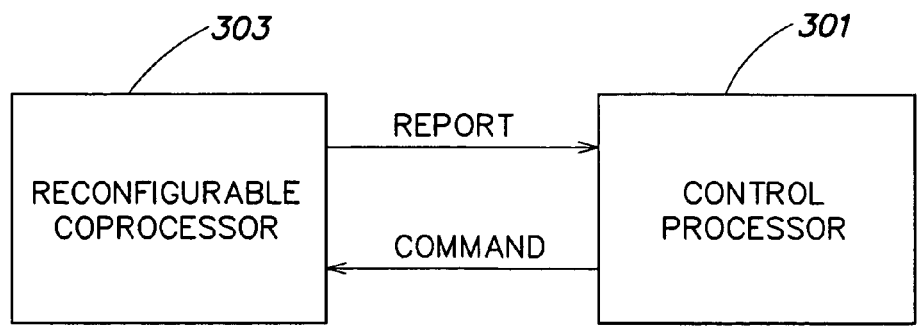
FIG. 3 is a block diagram illustrating a control processor and a reconfigurable coprocessor according to one embodiment of the invention.

In one embodiment of the invention, a control processor, for example a digital signal processor, operates in conjunction with a reconfigurable coprocessor to process spread spectrum signals. The control processor executes software related to the processing of digital spread spectrum signals and configures and reconfigures the coprocessor to perform specified functions. The coprocessor may perform the functions of a RAKE receiver, as well as having additional functionality related to the processing of spread spectrum signals in the wireless system, which is described in detail below. The coprocessor includes hardware for performing the functions, and commands defining these functions are received from the control processor. Some functions may be performed by software executing on the control processor, while other functions may be performed by hardware in the coprocessor. For example, the intelligence of how to communicate using a particular wireless standard (e.g., using a protocol, data signal symbol rate, chip rate, set of spreading codes, etc.) may be performed in the control processor, while repetitive mathematical computations and other operations may be performed by the reconfigurable coprocessor. Thus, as shown in FIG. 3, control processor 301 generates commands for coprocessor 303. Coprocessor 303 reports the results of performing these commands to the control processor.

The reconfigurable coprocessor 303 may be viewed as including a pool of physical hardware resources. The control processor 301 configures and reconfigures coprocessor 303 via commands to perform functions related to the processing of spread spectrum signals. The commands call logical resources in the coprocessor to perform the processing functions. The logical resources are mapped onto the physical resources by selecting and utilizing hardware resources from the pool of hardware resources.

The reconfigurable coprocessor 303 may be scalable to provide flexible processing capability. Thus, when a relatively large processing capacity is required, a high clock rate may be used. This permits time sharing of physical resources. When a relatively low processing capacity is required, a low clock rate may be used, thereby reducing or eliminating the need for time sharing of the physical resources and reducing power consumption. In addition, the supply voltage of the reconfigurable coprocessor 303 may be varied in conjunction with the clock rate to reduce power consumption.

A simple example may be used to illustrate physical and logical resources and scalability. First, assume that correlators A and B are available as physical resources and that RAKE fingers 1 and 2 are required as logical resources to process incoming signals. RAKE fingers 1 and 2 can be mapped onto correlators A and B, respectively, and coprocessor 303 may operate at a relatively low clock rate. Now assume that conditions change and that RAKE fingers 1, 2, 3 and 4 are required as logical resources to process incoming signals. Under these conditions, the coprocessor 303 may operate at a relatively high clock rate. RAKE fingers 1 and 2 may be mapped onto and time share correlator A, and RAKE fingers 3 and 4 may be mapped onto and time share correlator B. Thus, the logical resources (e.g. RAKE fingers) may time share the physical resources (e.g. correlators) to achieve a desired operation. The above example also illustrates reconfiguration of coprocessor 303 from two RAKE fingers to four RAKE fingers.

By configuring and reconfiguring coprocessor 303, control processor 301 may cause coprocessor 303 to perform a variety of different functions, such as data demodulation of multipath signals (e.g., RAKE reception), cell search, and path search. Further, parameters of the hardware resources, such as the integration length, the type of PN sequence and the oversampling factor of correlators on the coprocessor, may be configured and reconfigured. The configuration of coprocessor 303 by commands from the control processor 301 may include utilizing some or all of the hardware resources to perform specified functions. The hardware resources may perform different functions at different times according to the commands received from the control processor. By allowing the coprocessor to be reconfigured, the combination of the control processor and coprocessor may operate with different wireless standards, simply by reprogramming the software executing on the control processor 301.

Figure 4:
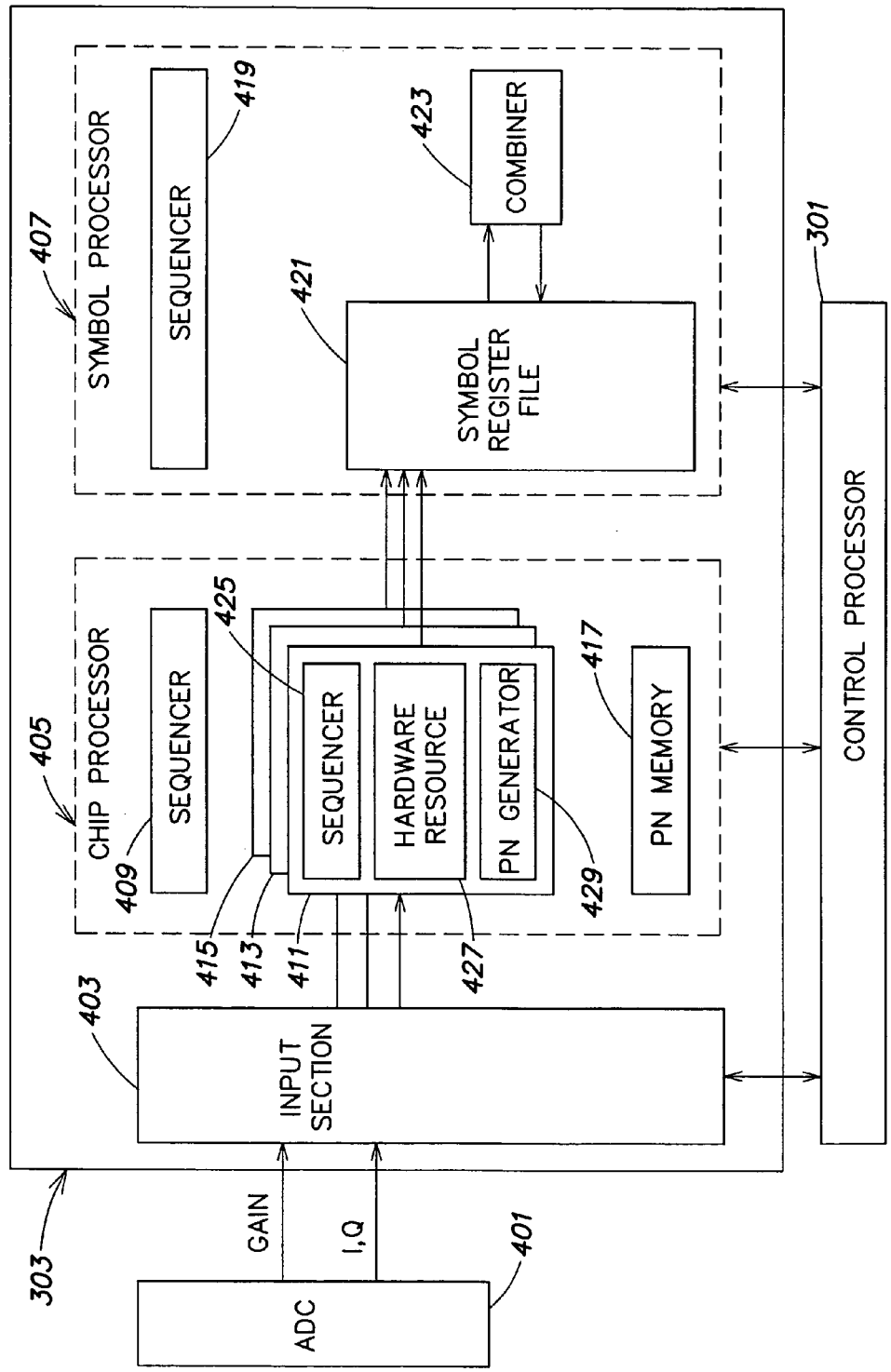
FIG. 4 is a high level block diagram of an illustrative example of a reconfigurable coprocessor architecture according to one embodiment of the invention.

An example of a high level architecture of coprocessor 303 is illustrated in FIG. 4. It should be appreciated that the general architecture of FIG. 4 is given only as an example. Various other coprocessor architectures may be used, and the invention is not limited in this respect. As discussed above, control processor 301 provides commands to coprocessor 303. Coprocessor 303 returns to the control processor reports which include information representative of the results of executing the commands. Coprocessor 303 includes an input section 403, a chip processor 405, and a symbol processor 407. After down conversion, a received signal may be converted to digital form by analog-to-digital converter 401. In-phase (I) and quadrature (Q) representations of the received signal are stored in input section 403. Chip processor 405 includes a sequencer 409, a plurality of RAKE elements 411, 413, and 415, and a pseudorandom sequence (PN) memory 417. Each RAKE element, in addition to a hardware resource 427, may include its own sequencer 425 and a PN generator 429. In a broader context, the PN sequence can represent not only the pseudorandom sequence but can also be a combination of the channelization code (pseudorandom or any other kind, such as orthogonal variable spreading factor (OVSF) codes) and the scrambling sequence.

Chip processor 405 receives data (e.g., signals) from input section 403 and performs processing operations on the data at the chip level. Sequencer 409 may be a basic microprocessor which is programmed by control processor 301 to configure RAKE elements 411, 413, and 415 to perform specified functions. As mentioned above, RAKE elements 411, 413, and 415 each include a hardware resource. The hardware resource may include, for example, a correlator, an averaging unit, a thresholding unit or a combination of elements.

It should be appreciated that different RAKE elements may include different hardware resources. For example, a RAKE element may include an averaging unit which averages correlations. A different RAKE element may also include a thresholding unit which determines if correlations exceed a specific threshold and transfers only correlations that exceed the threshold to control processor 301 and/or symbol processor 407. However, it should be appreciated that functions such as averaging and thresholding may alternatively be performed by software in the control processor or the symbol processor. By performing these functions in hardware on the coprocessor, the processing burden on the control processor is reduced, but the memory requirements of the RAKE elements may be increased. However, if these functions are performed in software on the control processor, not only is the processing burden on the control processor increased, but the amount of information that must be transferred between the coprocessor and control processor is also increased. Such an increase in the amount of information transferred may slow down processing of data from the input buffer. If implemented in hardware, the parameters of the averaging unit and thresholding unit may also be reconfigurable. For example, the length of the input array to be averaged and the threshold value of the thresholding unit may be reconfigured. It should be appreciated that other parameters of these units may also be reconfigured by the control processor, and the invention is not limited in this respect.

RAKE elements which have a correlator as a hardware resource 427 may also include a PN generator 429 which generates a spreading code that may be used to despread a received data sequence. PN generator 429 may receive a value from PN memory 417 (e.g., a seed value) and generate a spreading code based on this value. PN generator 427 may be reconfigurable by control processor 301. For example, the initial starting phase of a spreading code may be specified, such that the PN generator 427 generates the next segment of the spreading code during each activation. Other parameters which may be specified include the location in PN memory 417 from which to receive the seed value and the spreading factor of the received data sequence. The spreading factor is the ratio of the chip rate of the spreading code to the data rate of the information signal (the symbol rate). Since the PN sequence can include the channelization code and the scrambling sequence, PN memory 417 may contain the entire PN sequence.

The correlator (i.e., hardware resource 427) may correlate the spreading code generated by PN generator 429 with the received data signal to despread the signal. PN memory 417 may be loaded by control processor 301 with particular PN seed values or codes. As discussed above, the parameters of the correlator may be reconfigured by the control processor. For example, a delay value may be specified which indicates the number of samples an input signal is delayed before correlation so that it is aligned in time with the spreading code. The integration length and the over-sampling factor (i.e., the number of samples per chip) may also be specified. As discussed above, control processor 301 may specify via commands the functions and parameters of logical resources rather than physical (hardware) resources.

It should be appreciated that while chip processor 405 is shown as having three RAKE elements in FIG. 4, in practice the chip processor may have many more RAKE elements. Indeed, the chip processor may have any number of RAKE elements, and the invention is not limited in this respect. The RAKE elements may include any combination of the same or different hardware resources.

Symbol processor 407 performs operations on signals that have been despread by chip processor 405. For example, symbol processor 407 may combine multipath signals using different combining techniques, such as for example maximal ratio combining (MRC). Symbol processor may also calculate and update MRC coefficients based on channel estimates received from the control processor. MRC coefficients are used to weight multipath signal components before they are combined, as discussed below. Thus, symbol processor 407 includes a register file 412 for storing the despread signals output by RAKE elements 411, 413, and 415. Symbol processor 407 also includes a combiner 423 which may perform maximal ratio combining, and calculation of MRC coefficients. Alternatively, the calculation of coefficients may be performed in software by control processor 301.

Sequencer 419 may be a sequencer similar to sequencer 409 of chip processor 405. Sequencer 419 may be programmed by control processor 303 to activate combiner 423 at specified times with specified parameters. Similar to the RAKE elements of chip processor 405, the parameters of combiner 423 are reconfigurable by control processor 301. For example, a parameter may be reconfigured to specify the number of multipath signals to be combined. Additionally, the coefficient update rate and the data pilot channel symbol rate (i.e., the symbol rate of incoming data) may be reconfigured by control processor 301. The terms "reconfigurable" and "reconfigured" as used herein include configuring and reconfiguring the functions and parameters of coprocessor 303.

Figure 5:
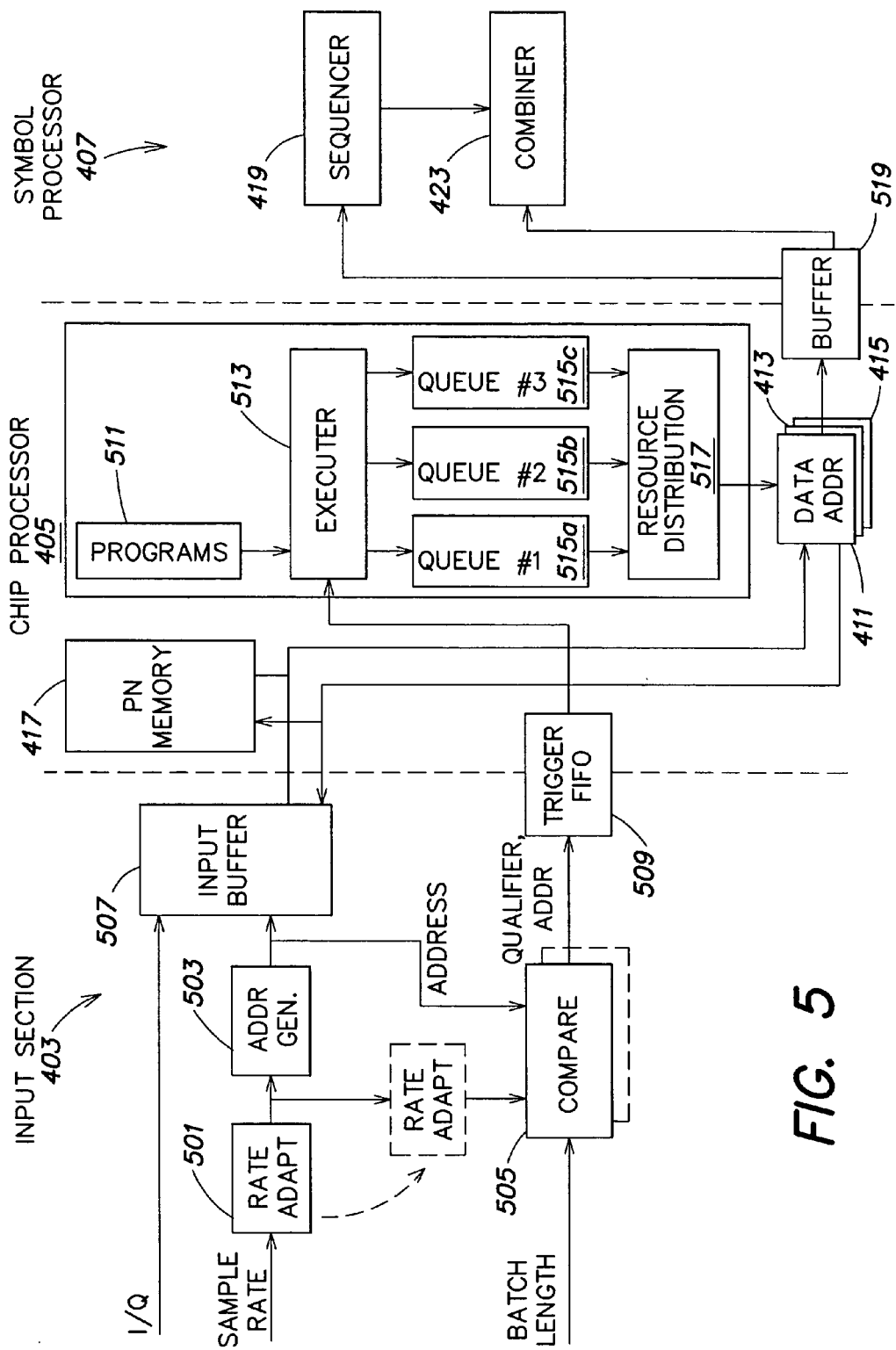
FIG. 5 is a more detailed block diagram of the reconfigurable coprocessor architecture of FIG. 4.

FIG. 5 is a more detailed diagram of reconfigurable coprocessor 303. Input section 403 includes a rate adaptation unit 501, an address generation unit 503, an input buffer 507, a compare unit 505, and a trigger FIFO 509. Rate adaptation unit 501 helps maintain timing alignment between the mobile station and the base station. That is, the base station and the mobile station may become misaligned in time due to timing drift caused by, for example, crystal frequency drift. As mentioned above, diverse multipath signals may arrive at the receiver at different times because they follow different paths from the transmitter to the receiver (some shorter, some longer). When all the diverse multipath signals are written into the input buffer 507, a trigger may be generated signaling the chip processor 405 to begin demodulating the multipath signals. However, as new data is received over the wireless channel, it replaces the old data in the input buffer. Thus, the chip processor demodulates the data during the time window which occurs after all multipath signals are written into the input buffer 507 but before the data is replaced by new data.

Figure 6:
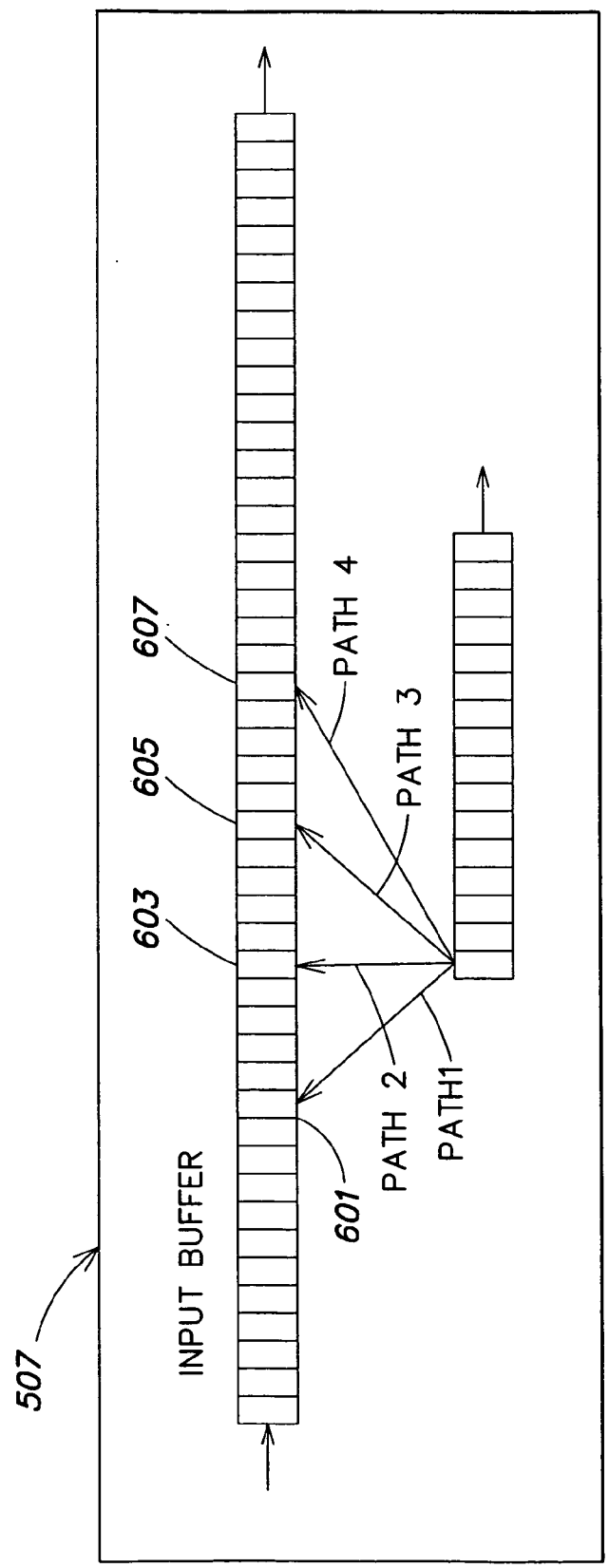
FIG. 6 is a diagram illustrating timing alignment of multipath signals in an input buffer according to one embodiment of the invention.

As shown in FIG. 6, input buffer 507 contains four diverse multipath signals. The signal received on path 1 begins at address 601 of input buffer 507, the signal received on path 2 begins at address 603, the signal received on path 3 begins at address 605, and the signal received on path 4 begins at address 607. Timing misalignment may cause a trigger to be generated before all multipath signals are written into the buffer or after a signal has been replaced by new data in the buffer. For example, if the timing at the mobile station is slightly slower than the timing at the base station (e.g., due to crystal inaccuracy), then the signal received on path 4 in FIG. 6 may be replaced in the input buffer when, according to the timing at the mobile station, the signal received on path 4 should still be in the input buffer. As a result, the mobile station may process incorrect data. Conversely, if the timing at the mobile station is slightly faster than the timing at the base station, then the signal received on path 4 may not yet be in the input buffer when, according to the timing at the mobile station, the signal received on path 4 should be in the input buffer. As a result, the mobile station may process incorrect data.

Rate adaptation unit 501 addresses this problem by compensating for the timing misalignment. This may be accomplished by, for example, by adjusting the sampling rate of the incoming signal or by adjusting the timing of trigger generation. For example, if it is known that the timing at the mobile station is slightly faster than that of the base station, generation of the trigger may be delayed such that a trigger is not generated until all multipath signals are written into the input buffer.

Address generation unit 503 determines the address in input buffer 507 at which each sample is stored. That is, as each sample is received, address generation unit increments the write address. Address generation unit 503 also provides the address of each sample to compare unit 505.

Compare unit 505 determines when a complete batch is in the input buffer 507. Compare unit 505 may count the number of samples that are read into the input buffer (e.g., based on the sampling rate). When the number of samples indicates a complete batch, then compare unit 505 generates a trigger to chip processor 405, indicating that the batch is ready for processing. The trigger may include a qualifier which specifies a program to execute. The trigger may also include other information such as an address in program memory 511 of the program specified by the qualifier. The trigger is stored in a trigger FIFO 509. Because chip processor 405 and input section 403 may operate at different clock speeds, a FIFO may be used for storing triggers so that executer 513 does not receive a trigger while it is processing a previous trigger.

Executer 513 receives a trigger from trigger FIFO 509 and retrieves the appropriate program from program memory 511. Program memory 511 is accessible by the control processor, allowing the control processor to reconfigure the coprocessor to perform specified functions with particular parameters. The programs in program memory 511 include the address offsets of diverse multipath signals in the input buffer 507 (i.e., the distance in address space from the beginning of diverse multipath signals). Executer 513 converts the program from program memory 511 into functions that are executable by RAKE elements 411, 413, and 415 and converts the address offsets into absolute addresses of input buffer 507. For example, if a program from program memory 511 is a program for performing stage 1 of cell search, executer 513 may convert the program to a plurality of correlation functions with the parameters specified by the program. These correlation functions may then be loaded into instruction queues 515*a*, 515*b*, and 515*c*.

Resource distribution unit 517 processes functions as they pass through the instruction queues 515. Resource distribution determines if a RAKE element is available to perform a function from an instruction queue. If a RAKE element is available, resource distribution unit 517 assigns the function to the available RAKE element (e.g., by loading the appropriate instructions into the sequencer of the RAKE element) and removes the function from the queue.

Instruction queues 515 may be prioritized so that functions in a queue having a higher priority are assigned to RAKE elements before functions in a queue having a lower priority. Thus, for example, functions relating to data demodulation (e.g., receiving a voice telephone call) may be placed in a higher priority queue than functions relating to performing path search, so that a user's telephone call is not interrupted to perform a task that may be of lesser importance. It should be appreciated that while three queues are shown in FIG. 5, any suitable number of queues may be used, and the invention is not limited in this respect.

Two different types of programs are stored in program storage memory 511. A first program type, referred to as a symbol mode program, is a program which is typically executed by a RAKE element at each activation (i.e., each time a trigger is generated) using the same parameters. For example, this type of program may be executed during data demodulation when despreading data from a fixed multipath location. Although this type of program may be modified by the control processor after processing a batch, such modification is typically not required. Thus, such a program may be remain indefinitely in program memory 511.

The second program type, referred to as a single mode program, is typically executed using different parameters at each activation. For example, a correlator may execute this type of program when it is desired to perform a small number of correlations at particular delay locations of the input buffer. Because this type of program typically has different parameters each time it is executed, it may be removed from or replaced in program memory 511 after execution by executer 513.

It should be appreciated that program memory 511 may be implemented as a single memory or two or more separate memories. If implemented as two separate memories, one memory may be used to store symbol mode programs and the other memory may be used to store single mode programs.

As discussed above, symbol processor 407 may receive the output of the correlators and combine them to increase signal strength. A buffer 519 includes a plurality of registers into which the RAKE elements may write. Each register may have a plurality of associated status flags. For example, a register may have a write flag to indicate when the register has been written and an enable processing flag to indicate that the register may be processed by the symbol processor. Thus, the symbol processor may begin execution when all of the write flags and enable processing flags for the registers required for processing are set.

As mentioned above, data from the input buffer may be processed in batches. The batch length may be, for example, one common pilot channel symbol (CPICH). Other batch lengths may also be used. For example, the batch length may be two or more CPICH symbols or may be one or more slots. Indeed, any batch length may be used and the invention is not limited in this respect.

The table of FIG. 7 illustrates batch processing interaction between the coprocessor and the control processor. The chip processor in the coprocessor receives a current batch k from the input buffer. The coprocessor receives commands from the control processor related to processing current batch k. These commands were generated by the control processor while the coprocessor was processing a previous batch k−1. After executing these commands, the coprocessor generates reports for the control processor based on the results of executing the commands. These reports are processed by the control processor while the coprocessor is processing a subsequent batch k+1. Thus, while the coprocessor is processing the commands for current batch k, the control processor handles the reports generated by the coprocessor relating to previous batch k−1 and prepares commands for the coprocessor for subsequent batch k+1.

Figure 8A:
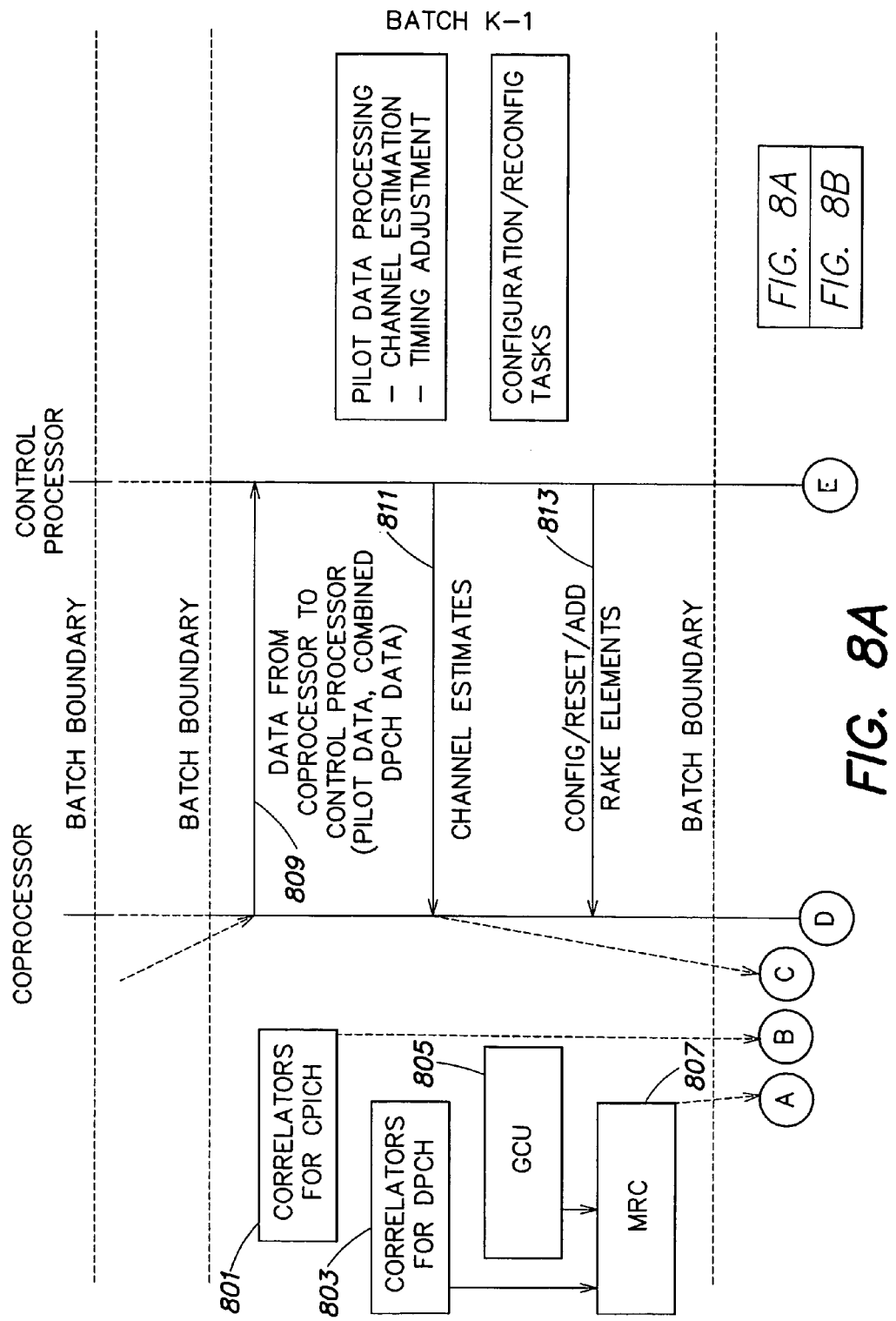
FIG. 8 is a diagram illustrating an example of a command and report sequence between the control processor and the coprocessor.
Figure 8B:
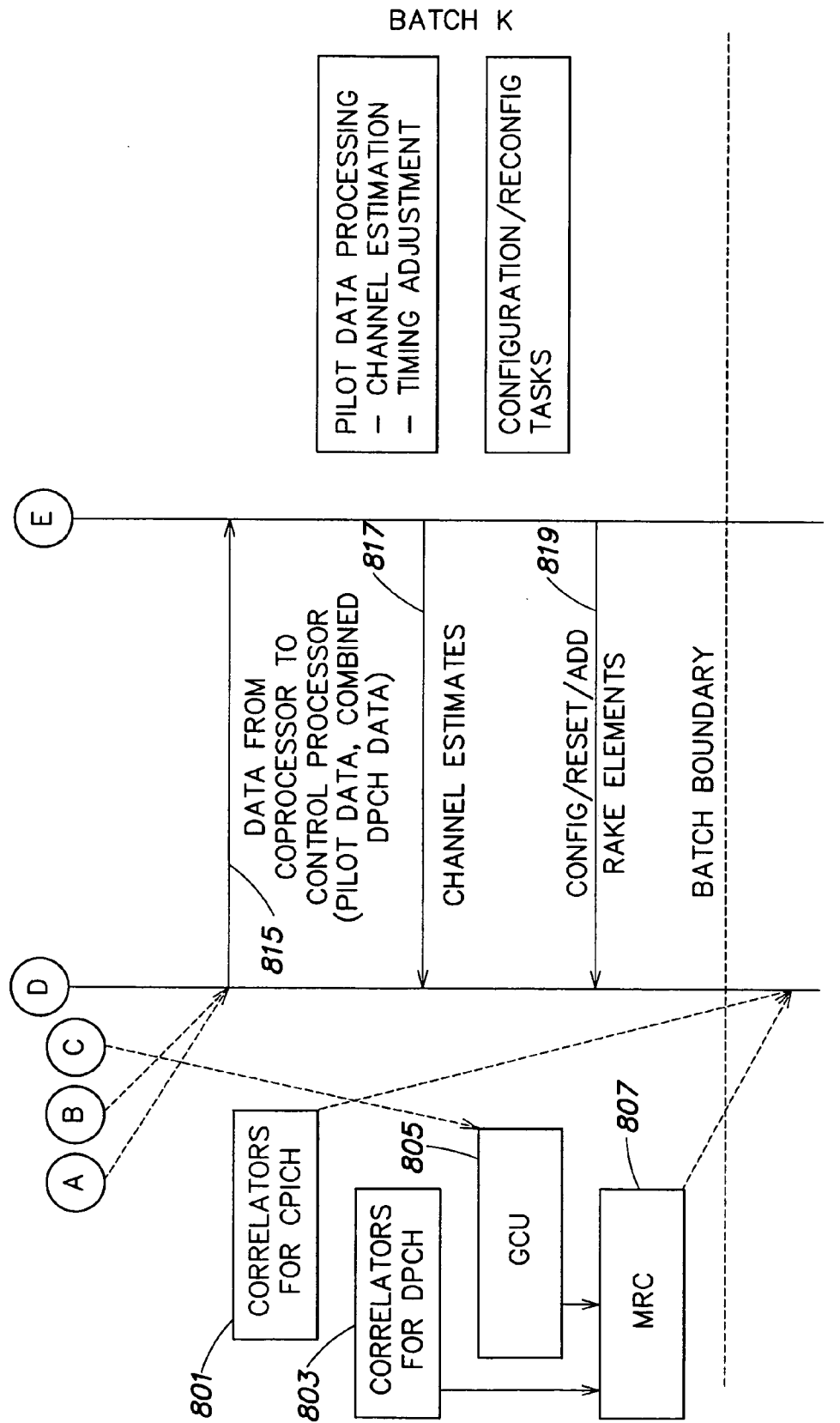

An example of batch processing is shown in the diagram of FIG. 8, which illustrates a command and report sequence between the control processor and the coprocessor. As shown in FIG. 8, selected RAKE elements of the chip processor are configured as correlators for the common pilot channel 801. That is, these RAKE elements are configured to despread data received on the common pilot channel. Other RAKE elements of the chip processor are utilized as correlators for the data pilot channel (DPICH) 803 to despread data received on the DPICH. The combiner of the symbol processor may be configured as a coefficient generator unit (CGU) 805 and a maximal ratio combiner (MRC) 805. During the processing of the previous batch k−1, the control processor receives report 809 which was generated during processing of batch k−2. Report 809 includes the data received on the CPICH and the combined DPICH data. The coprocessor receives the commands that were generated by the control processor in the previous batch k−1 and executes these commands. In batch k−1, the coprocessor receives two commands. Command 811 includes channel estimates and instructs CGU 805 to generate coefficients based on these channel estimates. Command 813 is a configuration command which may reset, activate, or change the configuration parameters of the RAKE elements. In batch k, the control processor receives report 815 which is generated by MRC 807 and correlators for CPICH 801. Similarly, the coprocessor receives commands 817 and 819 from the control processor. These commands were generated by the control processor based on the report received from the coprocessor in previous batch k−1.

The batch processing described above is pipelined. That is, different batches are processed simultaneously and are in different stages of completion at any given time. In other embodiments, batch processing is non-pipelined or event driven.

As mentioned above, the coprocessor may be reconfigured by the control processor to perform several different functions. These functions include, but are not limited to, data demodulation, cell search, and path search. For each function, the coprocessor 303 may be reconfigured for that specific function. Further, the tasks of a particular function may be divided between the coprocessor and the control processor. That is, these tasks may be partitioned such that some are performed in hardware on the coprocessor while others are performed in software on the control processor.

Figure 9:
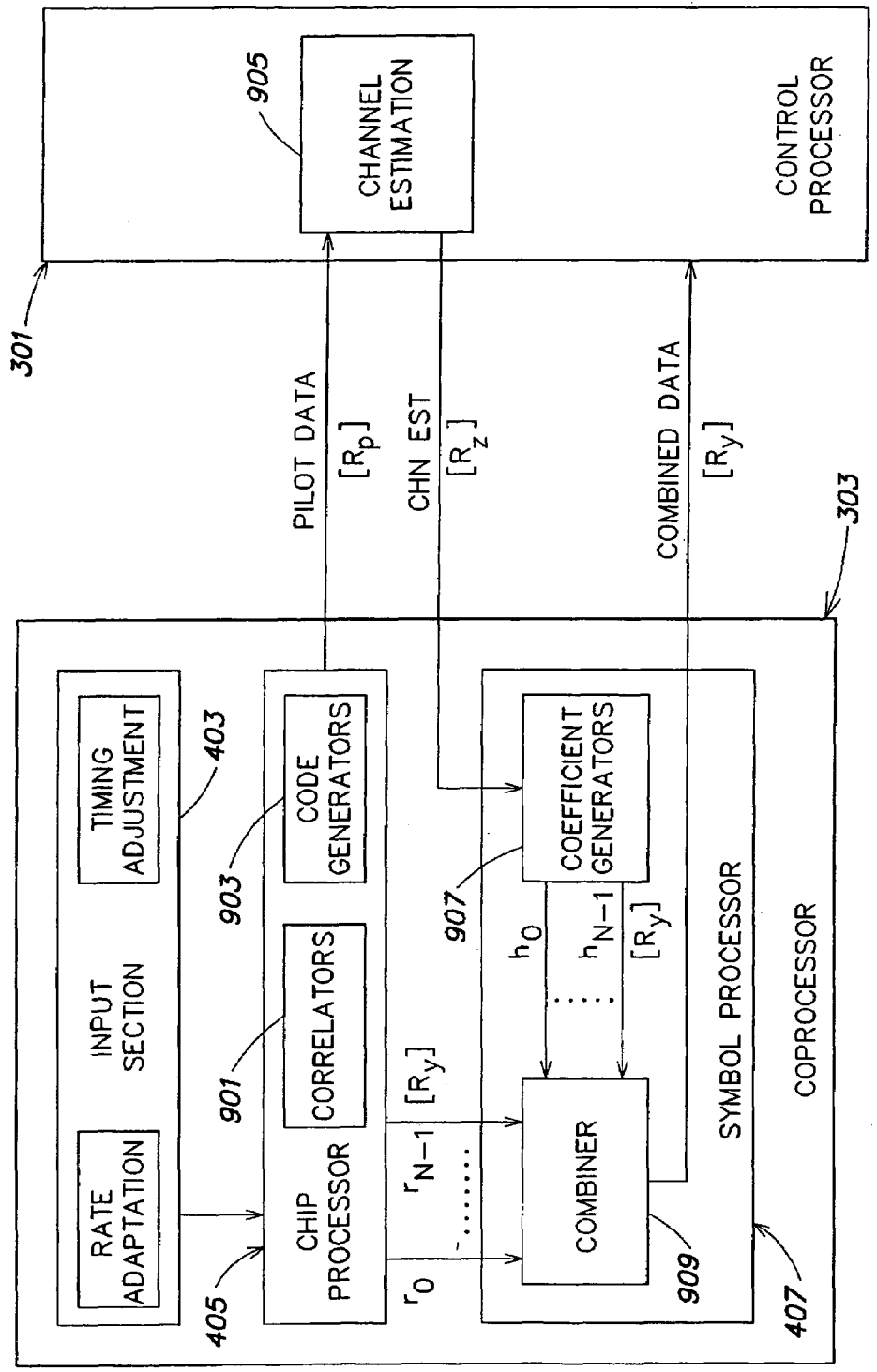
FIG. 9 is a block diagram illustrating a functional configuration of a coprocessor for use in data demodulation according to one embodiment of the invention.

FIG. 9 illustrates an example of the hardware and software partitioning for multipath data demodulation. Chip processor 405 includes correlators 901 and code generators 903. It should be understood that these are functional blocks representing functions of RAKE elements. As mentioned above, a correlator and PN generator may be included in one RAKE element. Thus, FIG. 9 is a functional representation of coprocessor 303, while FIGS. 4 and 5 are high-level architectural representations of coprocessor 303.

During data demodulation, several tasks are performed. Pilot data from the CPICH is demodulated. The demodulated pilot data may be used in performing channel estimation. Also, data from the DPICH is demodulated. As discussed above, DPICH data may be received over diverse paths. Each data set may be demodulated and the data from the demodulated signals may be combined, for example, using maximal ratio combining. The weighting coefficients may generated based on channel estimation information. After the signals have been weighted, they may be combined to generate a combined signal.

As shown in FIG. 9, the data demodulation tasks are divided between coprocessor 303 and control processor 301. Correlators 901 and code generators 903 may be used to demodulate data from the CPICH and DPICH. To reduce control overhead (i.e., the number of commands transferred between control processor 301 and coprocessor 303), correlators 901 and code generators 903 may operate using symbol mode programs. Thus, these units require only an initial configuration and an occasional modification of parameters. For example, one set of correlators and code generators may be reconfigured to demodulate data from the DPICH, while another set of correlators and code generators may be reconfigured to demodulate data from the CPICH. For example, each time a DPICH symbol is received in input buffer 403, a trigger activates the same symbol mode program for demodulating a DPICH symbol.

Channel estimation may be performed, for example, in control processor 301 by channel estimation software 905 executing on the control processor. Thus, the control processor may receive the demodulated pilot data from the coprocessor and use this information to generate channel estimates.

Combiner 909 may receive the demodulated DPICH signals from chip processor 405 and combine the signals using, for example, maximal ratio combining (MRC) with coefficients generated by coefficient generators 907. Coefficient generators 907 may generate the MRC coefficients using the channel estimates provided by control processor 301. Combiner 509 may report the combined data to control processor 301. It should be understood that combiner 909 may use methods of combining other than MRC, and the invention is not limited in this respect. For example, combiner 509 may use equal gain combining or any other suitable combining algorithm.

Figure 10:
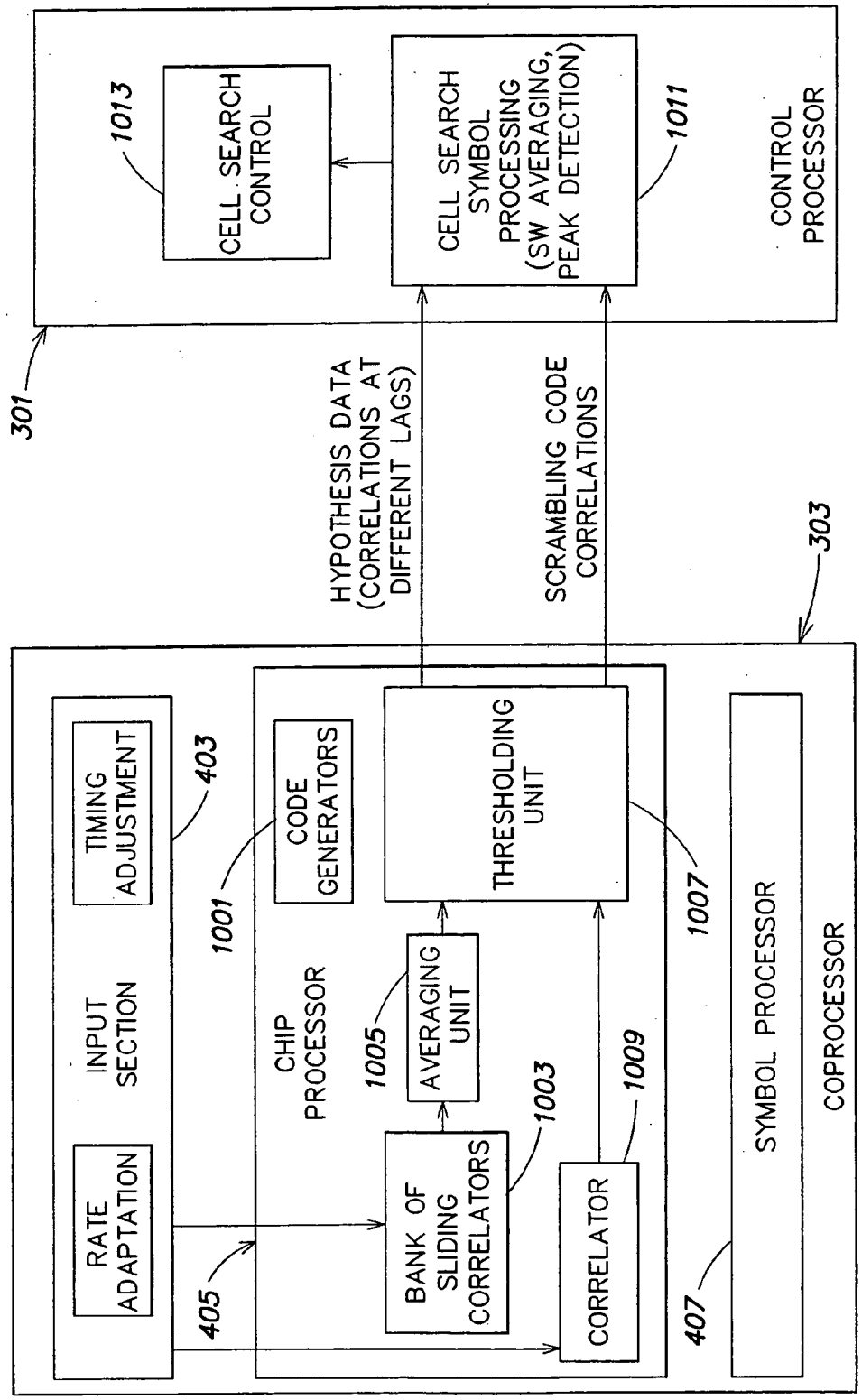
FIG. 10 is a block diagram illustrating a functional configuration of a coprocessor for use in cell search according to one embodiment of the invention.

It should further be understood that the hardware/software partitioning shown in FIG. 10 is given only as an example, and many other ways of partitioning data demodulation tasks between coprocessor 303 and control processor 301 may be used. For example, coefficient generation or combining may be performed in software in control processor 301. Similarly, channel estimation may be performed in symbol processor 407 on coprocessor 903.

FIG. 10 illustrates an example of partitioning between coprocessor 303 and control processor 301 in performing the cell search function. Cell search is the process of identifying a base station and its corresponding scrambling code. For example, in WCDMA systems, each base station may be identified by one of 512 primary scrambling codes. The base station uses the scrambling code to spread broadcast channels. These scrambling codes are typically divided into groups (i.e., 64 groups of 8 scrambling codes). Before the scrambling code is identified, the timing of the base station is determined. That is, for example, in WCDMA systems, the time axis is divided into radio frames. Each radio frame is divided into a number of slots. When performing cell search, a mobile station determines when in time a radio frame begins. When timing is determined, the mobile station may align one of the 512 scrambling codes in time with the signal received from the broadcast channel of the base station and then perform a correlation to determine if the broadcast channel is using that scrambling code.

Cell search is typically divided into three stages. In the first stage, a mobile station uses a primary synchronization code (PSC) to determine the slot timing. The PSC is broadcast over the primary synchronization channel (PSCH) by the base station at the beginning of each slot of a radio frame. Thus, a mobile station may determine the time of the slot boundary of a radio frame by correlating the received signal with the PSC at each chip position within a slot.

The second stage of cell search involves determining the frame timing of the base station. That is, although the slot timing is known, the slot at which the radio frame begins is determined in order to align in time the broadcast channel signal and the scrambling code. A scrambling code group may also be determined. The scrambling code group may indicate a group (e.g., eight) of possible scrambling codes that the base station may be using. The base station broadcasts a secondary synchronization code (SSC) on a secondary synchronization channel (SSCH). However, many different SSCs may be used, and the base station may broadcast one SSC at the beginning of each slot. Thus, assuming a radio frame having fifteen slots, the base station broadcasts one of the SSCs at the beginning of each slot, thereby producing a sequence of fifteen SSCs. The mobile station may determine where a radio frame starts based on the SSC sequence. The SSC sequence may also identify a scrambling code group of the base station.

The third stage of cell search involves determining which scrambling code of the scrambling code group is used by the base station. In the third stage, a mobile station may align each of the scrambling codes in the group in time with the broadcast channel of the base station and perform a correlation to determine which scrambling code is used.

Similar to data demodulation, these tasks may be divided between the control processor 301 and the coprocessor 303. Similar to FIG. 9, FIG. 10 is a functional representation of coprocessor 303.

In the example FIG. 10, the chip-level processing is performed in coprocessor 303. Averaging and thresholding of correlations may be performed either in coprocessor 303 or in control processor 301. Peak detection and related symbol processing may be performed in control processor 301. The functional units of the coprocessor 303 used in performing cell search include a bank of sliding correlators (BOSC) 1003, an averaging unit 1005, a thresholding unit 1007, and a correlator 1009. In the control processor, a cell search control module 1013 operates to configure the coprocessor based on, for example, which stage of cell search is to be performed. Control module 1011 may perform symbol level processing of data received from the coprocessor. For example, control module 1011 may perform peak detection, averaging, and thresholding.

Initially, for stage 1 of cell search, cell search control module 1013 may configure bank of sliding correlators 1003 to determine slot timing of a base station by correlating the PSC with data received over the primary synchronization channel. Averaging unit 1005 may be configured to average the PSC correlations generated by bank of sliding correlators 1003. Thresholding unit 1007 may be used to determine if the PSC correlations exceed a threshold. Only those correlations which exceed the threshold are reported to control processor 301. Control processor 301 may then detect the PSC peaks in the correlation, perform additional thresholding, and determine how to proceed. For example, control processor 301 may configure coprocessor 303 to repeat stage 1 of cell search or may configure coprocessor 303 to proceed to stage 2 of cell search. Thus, the determination of the PSC slot boundary may be performed by both coprocessor 303 and control processor 301.

Alternatively, the PSC slot boundary may be determined by control processor 301 using the hypothesis data (i.e., the correlations of the PSC at different delays) provided by the coprocessor 303. That is, the hypothesis data is not averaged or filtered using thresholds by coprocessor 303. The hypothesis data is simply reported to control processor 301, which performs the averaging and thresholding functions.

After stage 1 of cell search is complete, control processor 301 may configure coprocessor 303 to perform stage two of cell search. Thus, correlator 1009 may be reconfigured to perform correlations with the SSCs at the PSC location (e.g., the slot boundary determined in stage 1). These correlations may be averaged either by averaging unit 1005 of coprocessor 303 or by software in control processor 301. The symbol level processing involved in determining a code group and determining a frame boundary may be performed by control processor 301.

In stage 3 of cell search, the chip level processing, which involves correlations with the codes in the scrambling code group, may be performed by correlator 1009 (e.g., using the frame boundary and scrambling code group determined in stage 2). Averaging may be performed either in the coprocessor 303 by averaging unit 1005 or in software on control processor 301. The symbol processing functions, such as determining the scrambling code, may be performed in control processor 301.

It should be appreciated that if target cell search, in which the mobile station has extra information about the target cell (e.g., during a handover between cells), is being performed, fewer steps may be required. For example, knowing the frame time of a neighbor cell may decrease the search window for the frame timing of the target cell in performing timing synchronization. Similarly, knowing the scrambling code of a neighbor cell may confine the scrambling code group search for the target cell to fewer code groups.

Partitioning of tasks between coprocessor 303 and control processor 301 has been described for examples of specific functions, including data demodulation and cell search. In general, any desired partitioning may be utilized within the scope of the invention. The partitioning may be defined such that the hardware resources of coprocessor 303 are used for repetitive, high speed computations and other operations, and control processor 301 is used for slower, non-repetitive operations. Proprietary configurations, parameters and operations may be defined by software in control processor 301 and may be represented by commands sent to coprocessor 303. The proprietary operations may be executed by coprocessor 303, by control processor 301, or both.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

What is claimed is:

1. An apparatus for use in a wireless communication system, comprising:
   a reconfigurable coprocessor comprising a plurality of reconfigurable processing elements, the reconfigurable coprocessor adapted to process spread spectrum signal components and to provide reports indicative of results of processing the spread spectrum signal components; and
   a control processor adapted to receive the reports from the reconfigurable coprocessor and to generate commands to the reconfigurable coprocessor that modify at least one of the plurality of the reconfigurable processing elements based, at least in part, on the received reports, wherein the reconfigurable coprocessor further comprises a plurality of RAKE elements configured to receive the spread spectrum signal components and to perform data processing operations on the spread spectrum signal components in accordance with the commands, wherein each of the plurality of RAKE elements comprises a pseudo-random number generator to generate codes; a correlator to correlate the codes generated by the pseudo-random number generator with the spread spectrum signal components; and a seciuencer for configuring the correlator and the pseudo-random number generator based on the commands received from the control processor; the apparatus further comprising an input buffer to store information to be processed by the reconfigurable coprocessor in a plurality of successive batches, wherein the reconfigurable coprocessor processes a batch k of the plurality of batches according to current commands generated by the control processor based on reports provided by the reconfigurable coprocessor as a result of processing a batch k−1, and wherein the control processor generates next commands based on the reports provided by the reconfigurable coprocessor resulting from processing the batch k, the next commands being used to modify the reconfigurable coprocessor to process a batch k+1 of the plurality of successive batches.

2. The apparatus of claim 1, wherein the reconfigurable coprocessor further comprises an input buffer for storing the spread spectrum signal components.

3. The apparatus of claim 1, wherein reconfigurable parameters of the correlator include at least one of the group comprising an integration length, a delay value, an oversampling factor, and a scrambling code delay.

4. The apparatus of claim 1, wherein reconfigurable parameters of the pseudo-random number generator include at least one of the group comprising a scrambling sequence, a channelization code, a seed value or a complete PN code stored in memory.

5. The apparatus of claim 1, wherein the reconfigurable coprocessor further comprises a combiner to combine the spread spectrum signal components after despreading.

6. The apparatus of claim 5, wherein the sequencer controls the operation of the combiner based on commands received from the control processor.

7. The apparatus of claim 1, wherein the commands generated by the control processor reconfigure the reconfigurable coprocessor to perform operations related to cell search.

8. The apparatus of claim 1, wherein the commands generated by the control processor reconfigure the reconfigurable coprocessor to perform operations related to path search.

9. The apparatus of claim 1, wherein the commands generated by the control processor reconfigure the reconfigurable coprocessor to perform data demodulation.

10. The apparatus of claim 1, wherein the commands generated by the control processor reconfigure the reconfigurable coprocessor to perform operations related to channel estimation.

11. The apparatus of claim 1, wherein the plurality of the reconfigurable processing elements of the reconfigurable coprocessor is reconfigurable to perform different operations in response to the commands from the control processor.

12. The apparatus of claim 11, wherein the plurality of the reconfigurable processing elements comprises correlators, banks of sliding correlators, averaging units and thresholding units to perform a cell search operation in response to a command from the control processor.

13. The apparatus of claim 11, wherein the plurality of the reconfigurable processing elements comprises banks of sliding correlators, averaging units and thresholding units to perform a path search operation in response to a command from the control processor.

14. The apparatus of claim 11, wherein the plurality of the reconfigurable processing elements comprises correlators, code generators, a combiner and a coefficient generator to perform channel estimation and combining operations in response to a command from the control processor.

15. The apparatus of claim 2, wherein the input buffer includes a rate adaptation unit that is reconfigurable in response to a command from the control processor.

16. The apparatus of claim 11, wherein the reconfigurable processing elements are reconfigured to process the spread spectrum signal components in batches in response to the commands from the control processor.

17. The apparatus of claim 1, wherein the reconfigurable coprocessor is reconfigured to perform a single iteration of an operation in response to a command from the control processor.

18. The apparatus of claim 1, wherein the reconfigurable coprocessor is reconfigured to perform multiple iterations of an operation in response to a command from the control processor.

19. An apparatus for use in a wireless communication system, comprising:
   a reconfigurable coprocessor comprising a plurality of reconfigurable processing elements, the reconfigurable coprocessor adapted to process spread spectrum signal components and to provide reports indicative of results of processing the spread spectrum signal components; and
   a control processor adapted to receive the reports from the reconfigurable coprocessor and to generate commands to the reconfigurable coprocessor that modify at least one of the plurality of the reconfigurable processing elements based, at least in part, on the received reports, wherein a data rate of the reconfigurable coprocessor is reconfigurable in response to a command from the control processor.

20. An apparatus for use in a wireless communication system, comprising:
   a reconfigurable coprocessor comprising a plurality of reconfigurable processing elements, the reconfigurable coprocessor adapted to process spread spectrum signal components and to provide reports indicative of results of processing the spread spectrum signal components; and a control processor adapted to receive the reports from the reconfigurable coprocessor and to generate commands to the reconfigurable coprocessor that modify at least one of the plurality of the reconfigurable processing elements based, at least in part, on the received reports, wherein an operating voltage of the reconfigurable coprocessor is reconfigurable in response to a command from the control processor.

21. A method for signal processing in a wireless communication system, comprising acts of:

processing spread spectrum signal components in a reconfigurable coprocessor comprising a plurality of reconfigurable processing elements and generating reports indicative of results of processing the spread spectrum signal components; and generating commands by a control processor adapted to receive the reports and providing the commands to the reconfigurable coprocessor to modify at least one of the plurality of the reconfigurable processing elements, the commands being based, at least in part, on the received reports, wherein the reconfigurable coprocessor comprises a plurality of RAKE elements to receive the spread spectrum signal components, the method further comprising receiving the spread spectrum signal components and performing processing operations on the spread spectrum signal components in the plurality of RAKE elements, wherein the processing operations comprise generatina codes in a pseudo-random number generator, correlating, in a correlator, the codes generated by the pseudo-random number generator with the spread spectrum signal components, and configuring the correlator and the pseudo-random number generator based on the commands received from the control processor.

22. The method of claim 21, wherein the control processor generates commands for reconfiguring the reconfigurable coprocessor to perform operations related to cell search.

23. The method of claim 21, wherein the control processor generates commands for reconfiguring the reconfigurable coprocessor to perform operations related to path search.

24. The method of claim 21, wherein the control processor generates commands for reconfiguring the reconfigurable coprocessor to perform operations related to channel estimation.

25. The method of claim 21, wherein modifying at least one of the plurality of the reconfigurable processing elements comprises reconfiguring the reconfigurable coprocessor to perform a desired operation in response to a command from the control processor.

26. The method of claim 25, wherein reconfiguring the reconfigurable coprocessor comprises reconfiguring correlators, banks of sliding correlators, averaging units, and thresholding units to perform a cell search operation in response to a command from the control processor.

27. The method of claim 25, wherein reconfiguring the reconfigurable coprocessor comprises reconfiguring banks of sliding correlators, averaging units and thresholding units to perform a path search operation in response to a command from the control processor.

28. The method of claim 25, wherein reconfiguring the reconfigurable coprocessor comprises reconfiguring correlators, code generators, a combiner, and a coefficient generator to perform channel estimation and combining operations in response to a command from the control processor.

29. The method of claim 25, wherein reconfiguring the reconfigurable coprocessor comprises performing a rate adaptation operation in response to a command from the control processor.

30. The method as defined in claim 21, wherein processing the spread spectrum signal components comprises processing the spread spectrum signal components in batches defined by a command from the control processor.

31. The method of claim 21, wherein processing the spread spectrum signal components comprises performing a single iteration of an operation in response to a command from the control processor.

32. The method of claim 21, wherein processing the spread spectrum signal components comprises performing multiple iterations of an operation in response to a command from the control processor.

33. A method for signal processing in a wireless communication system, comprising acts of:

processing spread spectrum signal components in a reconfigurable coprocessor comprising a plurality of reconfigurable processing elements and generating reports indicative of results of processing the spread spectrum signal components; and generating commands by a control processor adapted to receive the reports and providing the commands to the reconfigurable coprocessor to modify at least one of the plurality of the reconfigurable processing elements, the commands being based, at least in part, on the received reports, wherein modifying at least one of the plurality of the reconfigurable processing elements comprises reconfiguring the reconfigurable processor to perform a desired operation in response to a command from the control processor and wherein reconfiguring the reconfigurable coprocessor comprises controlling the data rate of the reconfigurable coprocessor in response to a command from the control processor.

34. The method of claim 25, wherein reconfiguring the reconfigurable coprocessor comprises controlling an operating voltage of the reconfigurable coprocessor in response to a command from the control processor.

35. The method of claim 25, wherein reconfiguring the reconfigurable coprocessor comprises reconfiguring the plurality of the reconfigurable processing elements in the reconfigurable coprocessor.

36. The method of claim 25, wherein reconfiguring the reconfigurable coprocessor comprises reconfiguring the reconfigurable coprocessor to perform different operations in response to different commands from the control processor.

37. The method of claim 25, further comprising programming operating parameters of the reconfigurable coprocessor in response to commands from the control processor.

38. The method of claim 25, further comprising dynamically altering the configuration of the reconfigurable coprocessor in response to commands from the control processor.

39. An apparatus for use in a wireless communication system, comprising:

a reconfigurable coprocessor comprising a plurality of reconfigurable processing elements, the reconfigurable coprocessor adapted to process spread spectrum signal components and to provide reports indicative of results of processing the spread spectrum signal components; and a control processor adapted to receive the reports from the reconfigurable coprocessor and to generate commands to the reconfigurable coprocessor that modify at least one of the plurality of the reconfigurable processing elements based, at least in part, on the received reports, the reconfigurable coprocessor comprising a RAKE receiver having:

a programmable number of fingers each configured to demodulate the spread spectrum signal components received from a corresponding transmission path; and a sequencer whose program is changed by the control processor to dynamically alter the number of fingers in the RAKE receiver during operation of the RAKE receiver.

40. The apparatus of claim 5, wherein the combiner comprises a maximal ratio combiner.

41. The apparatus of claim 1, wherein the commands call logical resources in the reconfigurable coprocessor and wherein the logical resources are mapped onto physical resources of the reconfigurable coprocessor.

42. The apparatus of claim 41, wherein the physical resources are time shared among the logical resources.

43. The apparatus of claim 1, wherein the reports are provided to the control processor on parallel output channels.

44. The apparatus of claim 1, wherein two or more operations are executed in parallel in response to at least one of the commands.

45. The apparatus of claim 1, wherein the control processor and the reconfigurable coprocessor perform non-pipelined processing of the spread spectrum signal components.

46. The apparatus of claim 1, wherein the commands generated by the control processor comprise:

at least one channel estimate and instructions for the coprocessor to generate coefficients based on the at least one channel estimate; and a configuration command to reset, activate and/or change at least one configuration parameter associated with the plurality of RAKE elements.

47. The apparatus of claim 39, wherein the at least one of the plurality of reconfigurable processing elements modified by the commands includes the number of fingers in the RAKE receiver used during operation to process the spread spectrum signal components.

* * * * *

UNITED STATES PATENT AND TRADEMARK OFFICE
CERTIFICATE OF CORRECTION

PATENT NO.        : 7,433,389 B2
APPLICATION NO.   : 10/300055
DATED             : October 7, 2008
INVENTOR(S)       : Joern Soerensen It is certified that error appears in the above-identified patent and that said Letters Patent is hereby corrected as shown below:

In Claim 1, Col. 13, Line 30, delete "seciuencer" and insert -- sequencer --

In Claim 19, Col. 14, Line 62, delete "processor." and insert -- processor; wherein the reconfigurable coprocessor comprises a plurality of physical resources shared by a variable number of logical resources, and wherein the data rate is reconfigured by increasing a clock rate used to time share the plurality of physical resources when a number of logical resources sharing the plurality of physical resources is increased and decreasing the clock rate when the number of logical resources sharing the plurality of physical resources is decreased. --

In Claim 20, Col. 15, Line 11, delete "processor." and insert -- processor; the apparatus further comprising an input buffer to store information to be processed by the reconfigurable coprocessor in a plurality of successive batches, wherein the reconfigurable coprocessor processes a batch k of the plurality of batches according to current commands generated by the control processor based on reports provided by the reconfigurable coprocessor as a result of processing a batch k-1, and wherein the control processor generates next commands based on the reports provided by the reconfigurable coprocessor resulting from processing the batch k, the next commands being used to modify the reconfigurable coprocessor to process a batch k+1 of the plurality of successive batches. --

In Claim 21, Col. 15, Line 31, delete "generatina" and insert -- generating --

In Claim 21, Col. 15, Lines 36-37, delete "processor." and insert -- processor; wherein acts of: processing includes an act of using the reconfigurable coprocessor to process a current batch of data based on commands generated by the control processor during processing of a previous batch of data and to generate reports relating to results of processing the current batch of data; and generating commands includes an act of using the control processor to process the reports relating to the previous batch of data and to generate commands relating to a subsequent batch of data during processing of the current batch of data. --

In Claim 33, Col. 16, Line 36, delete "processor." and insert -- processor; wherein controlling the data rate comprises modifying a clock rate used to time share a plurality of physical resources between a variable number of logical resources, such that the clock rate is increased when a number of logical resources sharing the plurality of physical resources is increased and the clock rate is decreased when the number of logical resources sharing the plurality of physical resources is decreased. --

UNITED STATES PATENT AND TRADEMARK OFFICE
CERTIFICATE OF CORRECTION

PATENT NO. : 7,433,389 B2
APPLICATION NO. : 10/300055
DATED : October 7, 2008
INVENTOR(S) : Joern Soerensen It is certified that error appears in the above-identified patent and that said Letters Patent is hereby corrected as shown below:

In Claim 39, Col. 17, Line 10, delete "receiver." and insert -- receiver; the apparatus further comprising an input buffer to store information to be processed by the reconfigurable coprocessor in a plurality of successive batches, wherein the reconfigurable coprocessor processes a batch k of the plurality of batches according to current commands generated by the control processor based on reports provided by the reconfigurable coprocessor as a result of processing a batch k-1, and wherein the control processor generates next commands based on the reports provided by the reconfigurable coprocessor resulting from processing the batch k, the next commands being used to modify the reconfigurable coprocessor to process a batch k+1 of the plurality of successive batches. --

Signed and Sealed this

Nineteenth Day of May, 2009

JOHN DOLL
*Acting Director of the United States Patent and Trademark Office*